United States Patent [19]
Sander-Cederlof et al.

[11] Patent Number: 5,500,927
[45] Date of Patent: Mar. 19, 1996

[54] SYSTEM AND METHOD FOR SIMPLIFYING A COMPUTER-GENERATED PATH

[75] Inventors: Robert B. Sander-Cederlof, Dallas; John B. Ahlquist, Garland, both of Tex.

[73] Assignee: Macromedia, Inc., San Francisco, Calif.

[21] Appl. No.: 33,498

[22] Filed: Mar. 18, 1993

[51] Int. Cl.⁶ ..................................................... G06T 11/20
[52] U.S. Cl. ........................ 395/133; 395/142; 395/143
[58] Field of Search .................................. 395/133, 142, 395/143

[56] References Cited

U.S. PATENT DOCUMENTS

| | | | |
|---|---|---|---|
| 4,949,281 | 8/1990 | Hillenbrand et al. | 364/518 |
| 5,214,754 | 5/1993 | Okamota et al. | 395/142 |
| 5,305,432 | 4/1994 | Kubota | 395/143 |
| 5,309,521 | 5/1994 | Matsukawa | 382/22 |
| 5,408,598 | 4/1995 | Pryor, Jr. | 395/142 |
| 5,410,645 | 4/1995 | Ooka et al. | 395/142 |

OTHER PUBLICATIONS

Kvern, "Real World Freehand"(1991) pp. 66–91.
Dunham, "Optimum Uniform Piecewise Linear Approximation of Planar Curves", IEEE Transactions on Pattern Analysis and Machine Intelligence, vol. 8 No. 1 (Jan. 1986) pp. 67–75.

Primary Examiner—Heather R. Herndon
Assistant Examiner—Joseph H. Feild
Attorney, Agent, or Firm—Fulbright & Jaworski

[57] ABSTRACT

The present invention is for a system and process for simplifying complex graphical paths. The process first analyzes individual curve and straight line segments of the path, possibly splitting curved segments at local extrema points. Next, the process creates a list of points which includes the endpoints of all the original curve and straight line segments, as well as generating intermediate points along the curve and straight line segments. The process also flags each point in the list indicating what kind of point it is, or what the original path looks like at each point. Thereafter, the process flags any and all extrema points of the types the user specified. Then, the process uses a curve fitting routine for refitting each section of the path with new curves. The process tries to find a minimum set of curves which will reproduce the original path into a simplified version within the tolerances the user has specified.

34 Claims, 6 Drawing Sheets

SYSTEM AND METHOD FOR SIMPLIFYING A COMPUTER-GENERATED PATH

TECHNICAL FIELD OF THE INVENTION

This invention relates to graphic presentations and more particularly to a system and process for simplifying complex graphical paths.

BACKGROUND OF THE INVENTION

In computer systems with graphic capability, a problem results when a user wishes to generate a large number of complex graphic figures on a computer screen (or on a printer). Graphic figures are drawn as a series of connected curves and straight lines (paths), and complex figures may contain paths which have quite a large number of curved and straight line segments. Complex paths with a large number of segments correspondingly consume a large amount of computer memory, and require excessive time to draw on a screen or printer.

Various commercially available computer programs provide the ability to create paths for use in drawings, fonts, and other purposes. These programs usually provide several means for creating a path: by moving a stylus or other pointing device as in freehand drawing; by automatically generating a path which follows the outline of a bitmap image already available to the program; by piecewise drawing with a tool that generates straight line segments and curve segments; by interpretation of a mathematical description of a shape; and other such methods.

Examples of commercially-available computer programs which provide the ability to create and modify paths are:

(1) Adobe Illustrator, Adobe System Incorporated, Mountain View, Calif.

(2) Adobe Streamline, Adobe System Incorporated, Mountain View, Calif.

(3) Aldus FreeHand, Aldus Corporation, Seattle, Wash.

(4) Aldus IntelliDraw, Aldus Corporation, Seattle, Wash.

(5) Altsys Fontographer, Altsys Corporation, Richardson, Tex.

(6) Altsys Virtuoso, Altsys Corporation, Richardson, Tex.

(7) Arts & Letters, Computer Support Corporation, Dallas, Tex.

(8) AutoCad, AutoDesk, Inc., Bothell, Wash.

(9) CA-Cricket Draw, Computer Associates International, Inc., Islandia, N.Y.

(10) Canvas, Deneba Software, Miami, Fla.

(11) CorelDRAW!, Corel System Corporation, Ottawa, Ontario, Canada

(12) Expert Draw, Expert Software Inc., Coral Gables, Fla.

(13) Island Draw, Island Graphics Corporation, San Rafael, Calif.

(14) MacDraw Pro, Claris Corporation, Santa Clara, Calif.

(15) MicroGrafx Designer, MicroGrafx, Inc., Richardson, Tex.

(16) Professional Draw, Gold Disk (Gold Disk is a trademark of Sony Corporation)

However, none of these programs yet provide an ability to automatically reduce the number of segments in an existing path while maintaining the shape of the path within a user-specified or predetermined tolerance.

Accordingly, what is needed is a system and process for simplifying complex paths in order to conserve computer memory and to allow for easier and quicker path construction and manipulation. What is further needed is a system and process for specifying a complex path with a fewer number of line segments within a reasonable and predetermined tolerance.

SUMMARY OF THE INVENTION

These and other problems have been solved by a system and process that allows for the simplification of complex graphical paths. Often such a complex path was originally created by some method which used more precision than necessary for screen or printer display, or by some other method which produced more curve segments than are really necessary. The present invention reduces the number of segments and is still able to reproduce the path within a user-specified or predetermined tolerance.

A complex graphical path is generally divided into straight line segments and curve segments and defined as such by the method by which the path was generated. The path simplification process traverses the length of the path, collecting information about the path's curve and straight line segments, and possibly divides curve segments at local extrema points. A local extrema is a point in a curve with either a vertical or horizontal slope having adjacent portions of the path before and after the point positioned on the same side of a line tangent to the point.

Information may be collected about straight line segments wherein the process determines the approximate average length of all the straight line segments within the path by counting the number of straight line segments and accumulating the approximate total of the length of all straight line segments. The same information may be collected about curve segments whereby the process determines the approximate average length of all curve segments by counting the number of curve segments and accumulating the approximate total of the length of all curve segments.

If it has been predetermined, such as by the user, that the process look for local horizontal extrema points, and if a curve segment has one or more local horizontal extrema points, then the process divides that curve segment into two or more segments at each of those extrema points. The same procedure is accomplished for any local vertical extrema points whereby the process divides a curve segment into two or more segments at each of those vertical extrema points.

The next procedure within the path simplification process traverses the path, creating a list of points. The process includes the endpoints at each of the curve segments and straight line segments into the point list. In addition, the process generates intermediate points within each curve and straight line segment. The process flags each point in the list with certain information about the path through that point.

During this next procedure, the process adds to the list several intermediate points at equal intervals for straight line segments. For example, if two extra points are added, these points will evenly divide the straight line segment into three shorter segments. For curve segments, the process adds to the list a number of intermediate points for each curve segment. The number of points is determined by a user-specified parameter, as modified by the ratio of the approximate length of the segment and the previously determined average length of all curve segments. The determined number of intermediate points will then be generated from the curve and added to the point list.

During the flagging procedure, the process will mark each point with certain flags indicating whether the path through that point is a corner, a smooth curve, or a tangent. A tangent point has a curve on one side and a straight line on the other, with a sloping line coinciding with the slope of the curve at the point. If it is possible to determine that the slope at a curve point is nearly horizontal or nearly vertical, that information will also be recorded with the point. If the path is an open path (the endpoints do not meet), both ends are marked as corner points.

The third procedure within the path simplification process examines the point list for all local extrema points of interest specified by the user. The process flags each interesting extrema point so that it will be included in the final output simplified path. This step is modified by the user-specified tolerance value, to eliminate redundant extrema in regions of shallow curvature.

The final procedure within the path simplification process generates a new simplified path. The minimum number of segment endpoints in the new path is the number of points in the point list which are now flagged as corners or extrema. The process divides the point list into sections bounded by corner and/or extrema points. Each of these sections is fed to a curve-fitting routine, which will fit either a straight line or a series of one or more curve segments to the points in each section. The resulting curve or straight line must not stray more than the user specified tolerance from the points in the section, and must have slopes at the endpoints determined by the point flags and surrounding data.

As each segment of the path is simplified, it is added to the output path. The process continues with the path simplification process until it comes to the end of the point list (in the case of an open path) or reaches the initial corner or extrema point (in the case of a closed path).

A technical advantage of this system and process of the present invention is that it provides for an automatic simplification of a complex graphical path.

Another technical advantage of the system and process of the present invention is that it allows for the simplification of complex paths in order to conserve computer memory.

A still further technical advantage of the present invention is that it allows for simplification of complex paths to allow for easier and quicker path construction and manipulation.

A still further technical advantage of the present invention is that it allows for an automatic simplification of a complex path within user-specified tolerances.

Yet another technical advantage of the present invention is that it reduces the number of line segments required to define a path, within a specific tolerance value.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
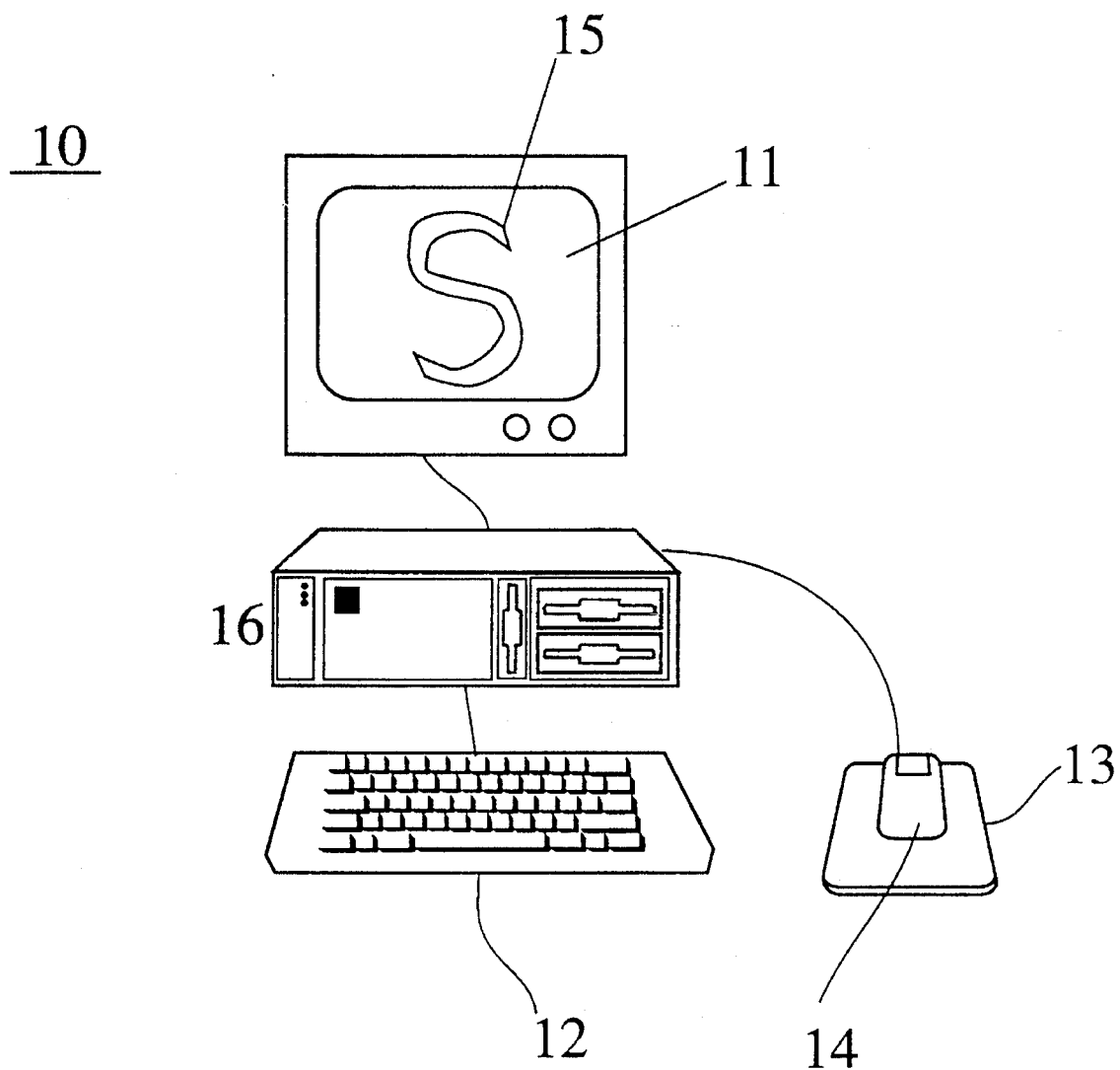
FIG. 1 shows an overall system utilizing a system and process for simplifying paths.

FIG. 1 shows representative system 10 for implementing the principles of the present invention which includes, as one example, computer 16, computer graphics display 11 and keypad 12. Also connected to computer graphics display 11 is mouse 14 with its associated pad 13. The path simplification process of the present invention might be embodied within a drawing program in computer system 10. As an example, path 15 is shown on display 11. Path 15 may have been drawn by any one of a number of drawing programs such as those previously listed.

In the following discussion, the term "curve" and "Bezier curve" refer to a curve which is defined by two endpoints which the curve passes through, and two additional points that the curve does not pass through and which control the tangent vectors passing through the endpoints. The curve may either be specified in terms of these four control points, or in terms of a pair of parametric cubic polynomials. Although forming no novel aspect of the present invention, the reader is referred to *Computer Graphics,* 2nd edition, Addison-Wesley, 1990, by Foley, VanDam, Feiner, and Hughes which is incorporated herein by reference for a background discussion of curves. In the discussion of the system and process which follows, the curve segments and curve-fitting techniques are described in terms of cubic Bezier curves. However, the system and process is not specifically dependent on these kinds of curves. For example, the curve segments could be represented as quadratic Bezier curves, B-splines, or NURBS (Non-Uniform Rational B-Splines). These and other representations and curve-fitting techniques are described in *Computer Graphics.*

The path simplification process and system of the present invention allows a user to specify, or predetermine, one or more tolerances or parameters for how closely a simplified path will approximate the original complex path.

Figure 2:
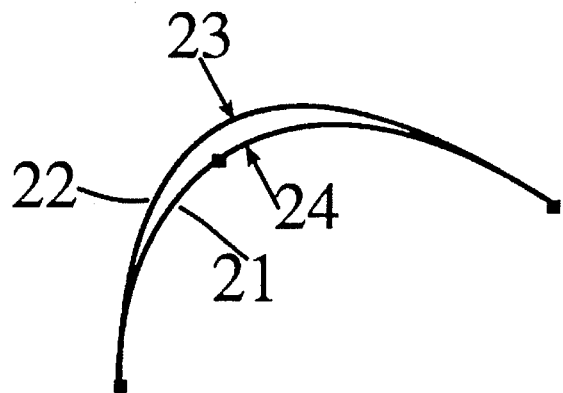
FIG. 2 shows an original path and a simpler path which approximates the original path within a tolerance value.

A user of the path simplification process and system may specify the maximum tolerance used to determine whether a simplified curve segment is close enough to the original path. FIG. 2 shows an original path 21 and a simplified path 22. The maximum distance between corresponding points 23 and 24 on both paths must be less than the user-specified maximum tolerance. The tolerance might be specified in units comparable to the units defining the path itself, or in terms of a percentage of the boundary dimensions, such as the diagonal or the longest side of the bounding box of the path. For example, a user may have a path which fits within a bounding rectangle of four inches by six inches; the user may decide to simplify this path within a tolerance of 0.01 inches. As another example, a user may have a collection of paths of varying sizes and may decide to simplify these paths as a group, specifying the tolerance as 1.0% of the diagonal of the bounding rectangle which encloses the entire group of paths.

Figure 3:
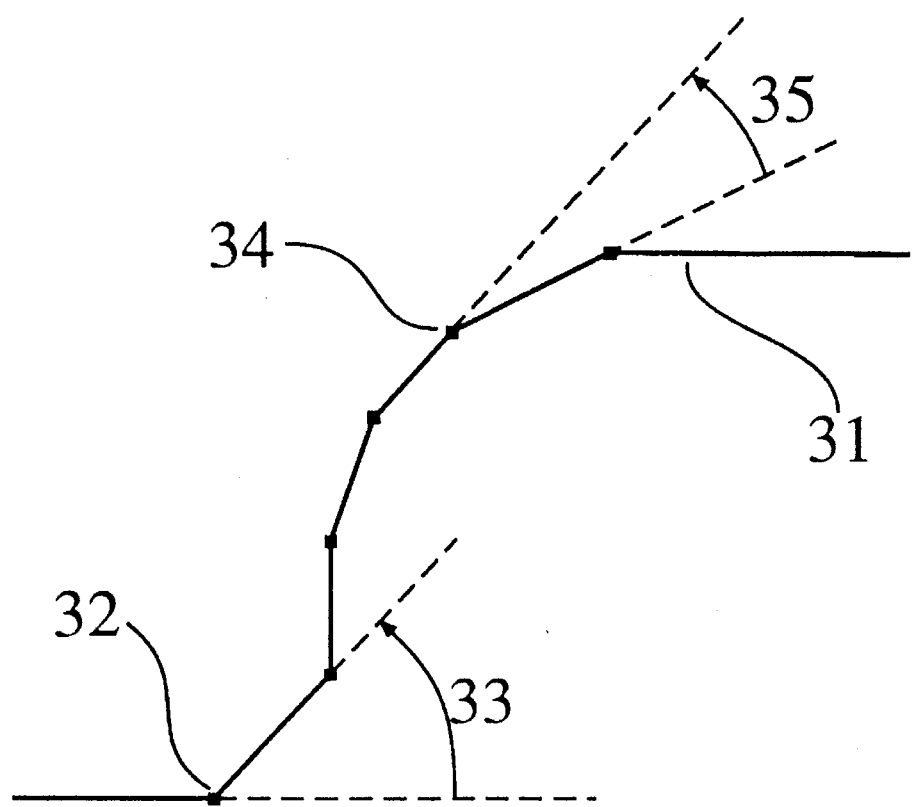
FIG. 3 shows an original path, and in particular the turning angles at two original points in the path.

Another parameter the user may specify is the minimum turning angle formed by two successive line segments such that the two line segments are to be considered as meeting at a corner point. If the angle is greater than or equal to this amount, the lines form a corner. If the angle is less than this amount, the lines are to be considered as part of a curve. FIG. 3 shows in path 31 an example of two line segments meeting at a corner point 32. Angle 33 is more than the user-specified minimum-corner-angle (for this example, assume the user specified a minimum-corner-angle of 30 degrees), so point 32 will be considered to be a corner. On the other hand, turning angle 35 at point 34 is less than the minimum-corner-angle, so point 34 will be considered to be a curve point. The system will attempt to make the simplified output path use the same slope on both sides of point 34 resulting in a smooth curve through or near that point.

Still another user-specified parameter should be the average number of intermediate points to generate for curved line segments during the Point Generation phase to be described later. A smaller number results in a coaset reproduction of the original path; a larger number, a closer reproduction.

Figure 4:
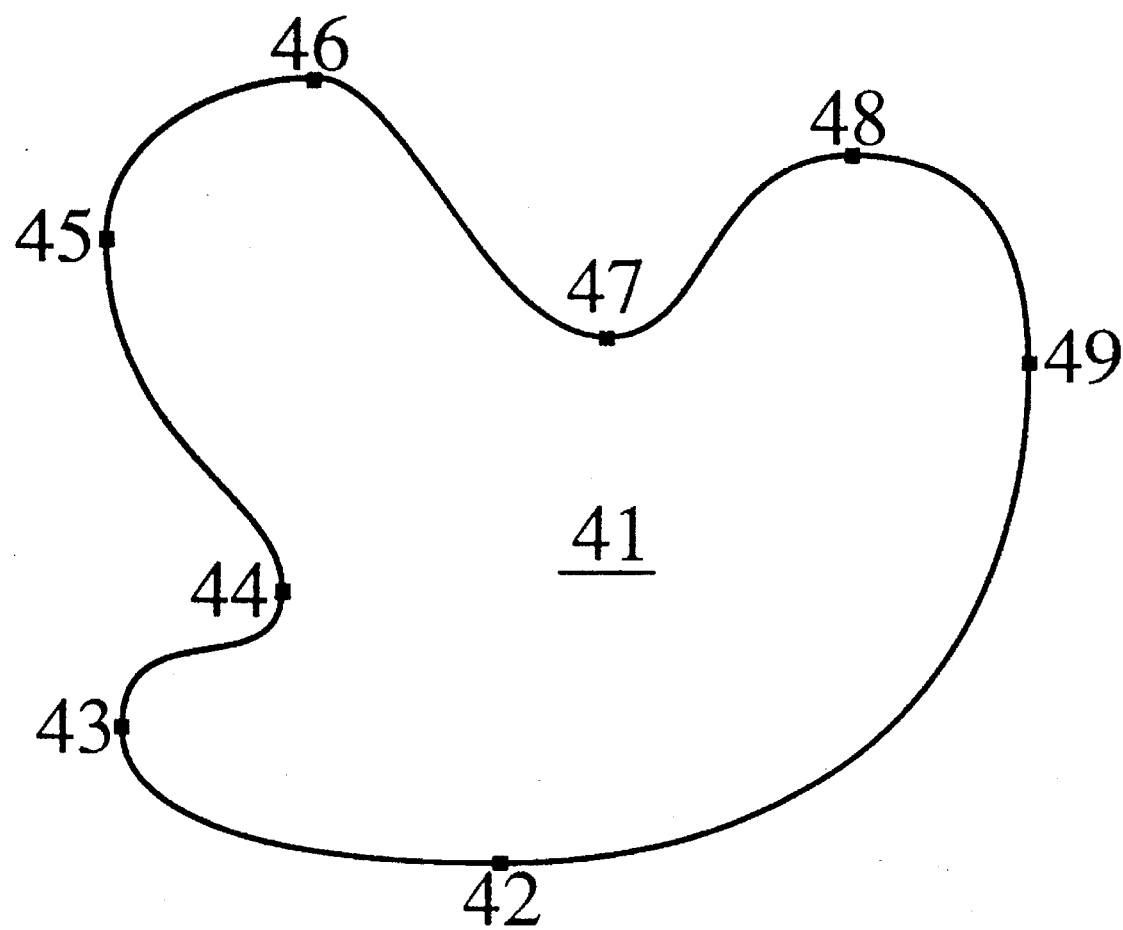
FIG. 4 shows a path with points at local horizontal and vertical extrema.

And finally, the user may specify whether or not to force the inclusion of local extrema points. FIG. 4 shows in path 41 examples of local horizontal extrema points 43, 44, 45 and 49; also shown are examples of local vertical extrema points 46, 47, 48 and 42. With reference to the previously described definition of local extrema, it may be readily observed that points along path 41 that lie on either side of local horizontal extrema points 43, 44, 45 and 49 lie on the same side of a tangent line running through each of these points, thus designating these as local horizontal extrema since these tangent lines are vertical. Furthermore, points lying along path 41 on both sides of local vertical extrema points 46, 47, 48 and 42 lie along the same side of a tangent line at each of these points, these tangent lines being horizontal, thus designating these extrema points as vertical.

Figure 5:
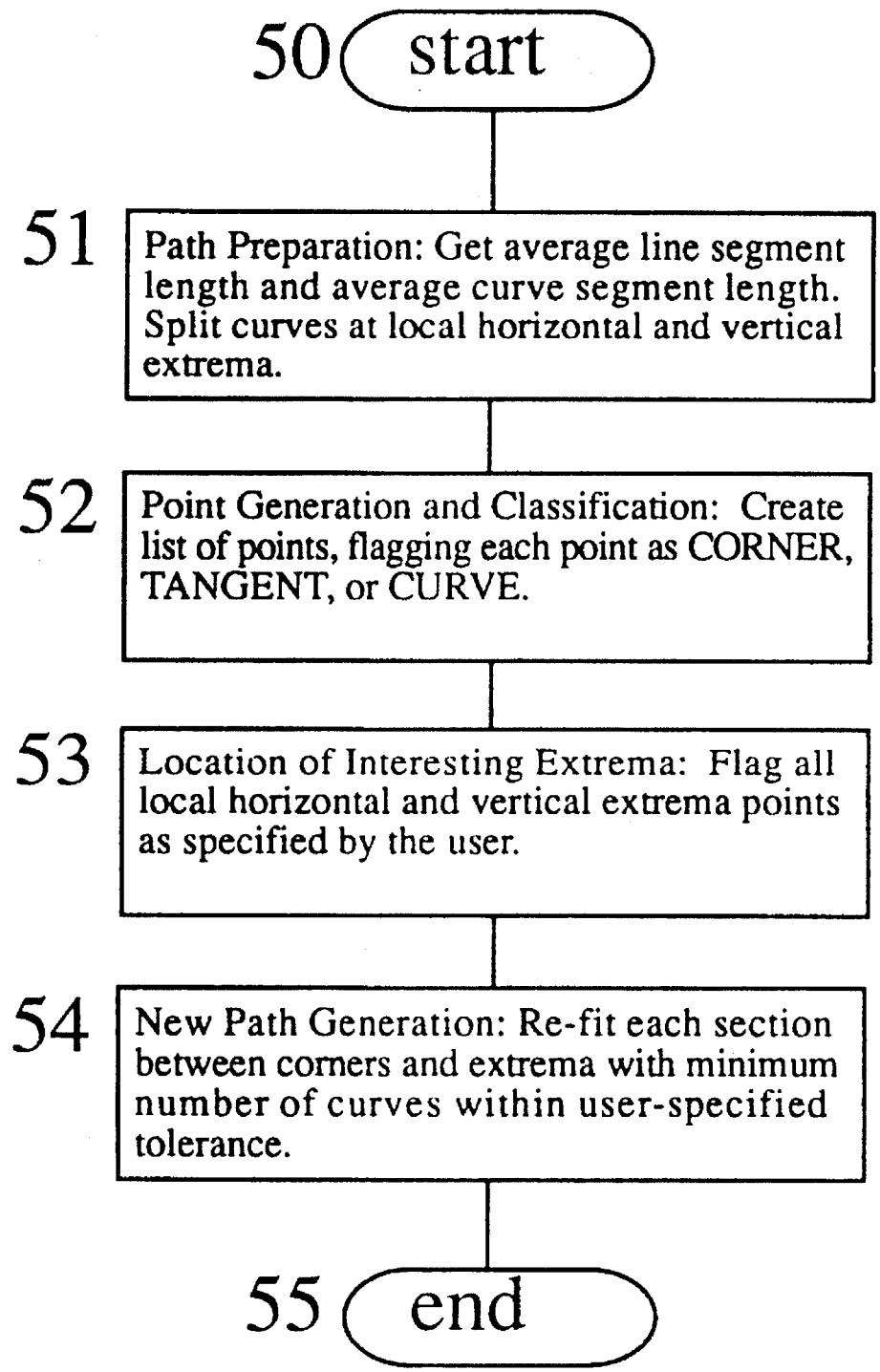
FIG. 5 is a flowchart illustrating the path simplification process.

Referring next to FIG. 5, there is shown an overall flowchart for a process of path simplification. The steps in the process are Path Preparation 51, Point Generation and Classification 52, Location of All Interesting Extrema 53, and New Path Generation 54. Starting at step 50, the process proceeds to step 51 to prepare the path by analyzing the individual curve and straight line segments and splitting curve segments at local extrema points. As previously noted, the path has been created by typical path generating processes which already have designated the individual curve and straight line segments. Next at step 52, the process creates a list of points which includes the end-points of all the original curve and straight line segments, as well as generates intermediate points along the curve and straight line segments. The process also flags each point in the list to indicate what kind of point it is, or what the original path looks like at each point. Thereafter, at step 53, the process flags any and all extrema points of the types the user specified. At step 54, the process will refit each section of the path with new curves. Each section is demarcated by corner and extrema points. Within each section the process will try to find a minimum set of curves which will reproduce the original path into a simplified version within the tolerance the user specified.

Steps 51–54 are further detailed as follows:

Step 51 Path Preparation: The process traverses the length of each path, collecting information about the path's curve and straight line segments, and possibly splitting curve segments at local extrema points. Note that this can result in a temporary increase in the number of segments in the path.
  a. Information about straight line segments: The process determines the approximate average length of all straight line segments by counting the number of straight line segments and accumulating the approximate total of the length of all straight line segments.
  b. Information about curve segments: The process determines the approximate average length of all curve segments by counting the number of curve segments and accumulating the approximate total of the length of all curve segments.
  c. If the user has designated that the process look for local horizontal extrema, and if a curve segment has one or more local horizontal extrema points, then the process divides that curve segment into two or more segments at each of those extrema points.
  d. If the user has designated that the process look for local vertical extrema, and if a curve segment has one or more local vertical extrema points, then the process divides that curve segment into two or more segments at each of those extrema points.

Step 52 Point Generation and Classification: The process traverses the path, creating a list of points. The process includes the end-points of each of the curve segments and the straight line segments into the point list. In addition, the process generates intermediate points within each curve and straight line segment. The process flags each point in the list with certain information about the path through that point.
  a. Straight Line Segments: The process adds to the list several intermediate points at equal intervals. For example, If two extra points are added, they will evenly divide the straight line segment into three shorter segments. The number of intermediate points added to straight line segments is not under the user's control, but is designated as a design choice within the system. Generally, it is advantageous to include at least two intermediate points within each straight line segment, thus totalling four points within each straight line segment. The reason is that a Bezier curve is straight enough to be a straight line if both of the control points (the intermediate points) are within the user specified tolerance of the straight line connecting the end-points. However, if a straight line is designated by less than four points, i.e., 1 or 0 intermediate points, any cubic Bezier curve could be fitted to the points, possibly resulting in a bowed line.
  b. Curve Segments: The process adds to the list a number of intermediate points for each curve segment. The number of points is determined by a user-specified parameter, as modified by the ratio of the approximate length of the segment and the previously determined average length of all curve segments. For example, if the user specifies sixteen intermediate points, curve segments of average length will be split in sixteen places. Shorter curves will be split at fewer places; longer curves, at more.

Figure 6:
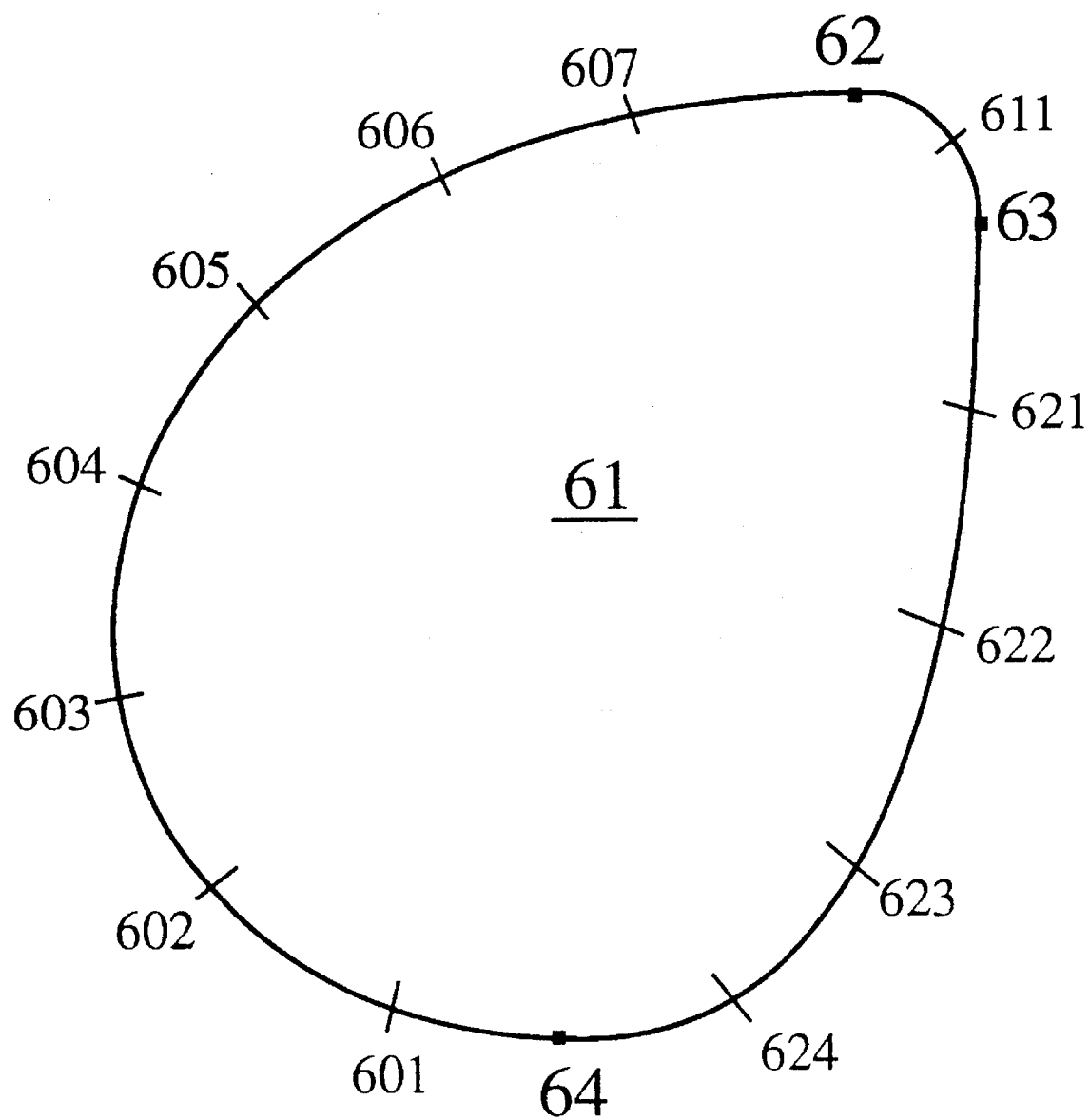
FIG. 6 shows a path with original points and intermediate points generated by the system.

The system will not split very short curves at all; very long curves may be split in as many as twice the number the user specified. The determined number of intermediate points will then be generated from the curve and added to the point list. For example, if the curves are represented as cubic Bezier curves, the splitting process may either be done by DeCastlejau divisions or by determining the cubic Bezier polynomial functions (x=cubic polynomial in t, y=cubic polynomial in t) and evaluating them at the appropriate values of t. Although forming no novel aspect of the present invention, the reader is referred to *Curves and Surfaces for Computer Aided Geometric Design,* 2nd edition, Academic Press, 1990, by Gerald Farin which is incorporated herein by reference for a background discussion of splitting processes. As an example, FIG. 6 shows path 61 with three original curve segments between original points 62, 63, and 64. Assume the user has specified that the average-length curve should be split at four places. The segment between original points 62 and 63 is shorter than average and was split at only one place, at 611; the path segment between original points 63 and 64 is about average length and was split at four places: 621, 622, 623, and 624; the path segment between original points 62 and 64 is about twice as long as the average, and was split at seven places, numbered consecutively from 601 through 607.

c. Information Flags: The process will mark each point with certain flags indicating whether the path through that point is a corner point, a smooth curve, or a tangent. A tangent point has a curve segment on one side and a straight line segment on the other, with the slope of the straight line segment coinciding with the slope of the curve segment at the point. If it is possible to determine that the slope at a curve point is nearly horizontal or nearly vertical, that information will also be recorded with the point. If the path is an open path (the endpoints do not meet), both ends are marked as corner points.

Figure 7:
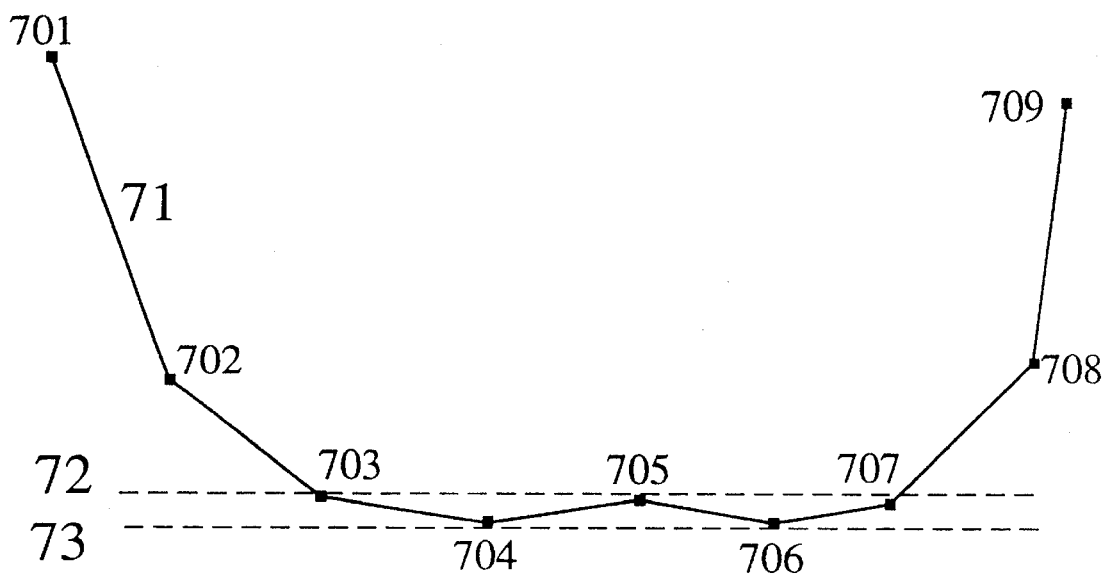
FIG. 7 shows a path with several extrema points lying within the user-specified tolerance band, from which one point will be chosen as an extrema point.

Step 53 Location of Interesting Extrema: The process examines the point list for all local extrema of interest specified by the user. The process flags each interesting extrema point so that it will be included in the final output path. This step is modified by the user-specified tolerance value, to eliminate redundant extrema in regions of shallow curvature. As an example, FIG. 7 shows path 71 consisting of line segments through the original points numbered 701 through 709. Dashed line 72 and 73 are horizontal lines separated by a distance equal to the user-specified tolerance. Note that points 704, 705, and 706 are all local extrema; however, they all fit between the dashed lines. These three points form an extrema run within the user-specified tolerance, so that the system will flag only one of the points as an extrema point. In this example, the system would flag middle point 705 as an extrema point.

Step 54 New Path Generation: The minimum number of segment end-points in the new path is the number of points in the point list which are now flagged as corners or extrema. The process divides the point list into sections bounded by corner and/or extrema points. Each of these sections is fed to a curve-fitting routine, which will fit either a straight line or a series of one or more curve segments to the points in each section. The resulting curve or straight line must not stray more than the user-specified maximum tolerance from the points in the section and must have slopes at the end-points determined by the point flags and surrounding data.

a. The process finds and stores the first point in the list which is either a corner point or an extrema point.

b. The process then proceeds to the next corner or extrema point, thus determining a section of points.

c. The process then determines the slope of the path at each end of the section. The slope may be determined in a variety of ways, and will likely be a function of the point flags, the relative position of nearby points, and the number of points between the end-points. For example, a good first approximation to the slope at a corner point is the angle from that point to the adjacent point. The slope at extrema which are curve points must be horizontal or vertical. At a non-extrema curve point, the slope is an average of the slopes to the nearest points on either side.

d. The process then attempts to fit a single curve to the points in the section, which has the determined slopes at the end-points and exactly passes through those end-points, such that the maximum distance between the interior points (points between the end-points) and the curve is less than the user-specified tolerance. If a section only has two points (the end points), and those points are corner points, then a straight line is used. One efficient and effective way to fit a curve to two or more points, given the slope at the end points, is given in *Graphics Gems* (Academic Press, 1990, edited by Andrew S. Glassnet) in the article "An Algorithm for Automatically Fitting Digitized Curves", pages 612–626, by Philip J. Schneider incorporated herein by reference.

e. If such a single curve is not possible, the process splits the section into two sections, and attempts to fit each of these sections. The section may be split at the point which has the largest error, at the point with the tightest curvature, or simply at the middle point. (This process can continue in a recursive manner until the sections are reduced to two points each, if necessary. In such a case, a segment might be fit with a series of straight lines.)

f. Once a curve which satisfies the conditions has been found, the process adds the curve to the output path. The process may check each curve at this time to see if it is close enough to being a straight line that a straight line segment would also be within tolerance. A Bezier curve is straight enough to be a straight line if both of the control points are within the user-specified tolerance of a straight line connecting the end points.

g. The process continues with steps b. through f. until it comes to the end of the point list (in the case of an open path), or reaches the initial corner or extrema point (in the case of a closed path).

The process and system of the present invention may be implemented in an iterative manner whereby the system repeats the process until a user-specified parameter is met, and then the output simplified path is offered to the user. The user may specify that the process be repeated until the system is unable to reduce the required memory by a specified percentage. For example, the user may specify that the process be repeated as long as the next iteration saves 25% in memory relative to the previous iteration of the process. Alternatively, the user may specify that the path simplification process be repeated until a user-specified error parameter is surpassed. For example, the process may measure an error upon each iteration, e.g. sum of the squares.

The process will discontinue the iterations once the error measurement reaches a user-specified value. The system could also be configured to compare the marginal error to the marginal memory savings so that the iterative process is stopped once the marginal error is greater than the marginal memory savings.

Although the present invention and its advantages have been described in detail, it should be understood that various changes, substitutions and alterations can be made herein without departing from the spirit and scope of the invention as defined by the appended claims.

What is claimed is:

1. A method implemented in a computer system of simplifying a graphical figure, said method comprising the steps of:

inputting and storing a computer-generated graphical figure having a path into said computer system;

receiving at least one tolerance value from an external source, said tolerance value determining an amount a more simplified path to be generated may deviate from said computer-generated path;

parsing said computer-generated path to characterize information specific to said computer-generated path at points to be generated along said simplified path, the number of said points dependent upon said tolerance value, said method generating and storing a set of points for inputting to a curve-fitting routine for producing said simplified path, wherein said parsing step further comprises the steps of:

analyzing individual line segments of said computer-generated path, wherein said line segments are comprised of straight and curved segments and said curved segments are divided at local extrema points;

creating a list of points for each of said line segments;

classifying each of said points based in part on said analyzation of said line segments;

dividing into sections said list of points based upon said classifications of said points;

inputting said sections of said list of points into said curve-fitting routine; and displaying on a display device coupled to said computer system a simplified graphical figure having a simplified path using said sections of points input into said curve-fitting routine.

2. The method as recited in claim 1, wherein a user specifies said tolerance value.

3. The method as recited in claim 1, wherein said classifying step labels each of said points with an attribute selected from the group consisting of:

a corner;

an end-point;

a local extrema;

a smooth curve; and a tangent.

4. The method as recited in claim 1, wherein said analyzing step further comprises the steps of:

determining an approximate average length of said straight segments; and determining an approximate average length of said curved segments.

5. The method as recited in claim 1, wherein said local extrema points may be horizontal or vertical.

6. The method as recited in claim 1, wherein said creating step further comprises the step of:

placing end-points of said line segments into said list.

7. The method as recited in claim 1, wherein said creating step further comprises the step of:

generating intermediate points within said line segments.

8. The method as recited in claim 1, wherein said classifying step further comprises the step of:

specifying said local extrema points to be included in said simplified path.

9. The method as recited in claim 8 wherein said sections are bounded by either said corner or said local extrema points.

10. The method as recited in claim 9 wherein said classifying step further comprises the steps of:

determining slopes of said path at each end of said sections; and fitting a single curve to each of said sections, said single curve having said determined slopes at each said end of said sections, said single curve passing through said ends, wherein a maximum distance between interior points along said path and said single curve is less than a predetermined tolerance value.

11. The method as recited in claim 10, further comprising the steps of:

dividing said section at a point near said maximum distance; and fitting a single curve to each of said section divisions.

12. The method as recited in claim 11, further comprising the step of:

replacing said single curve with a straight line segment when control points of a representation of said single curve are within a predetermined tolerance of said straight line segment connecting said ends.

13. A method implemented in a computer system of simplifying a graphical figure, said method comprising the steps of:

inputting and storing a computer-generated graphical figure having a path into said computer system;

collecting information about a line segment within said path;

creating a list of points that reside within said line segment, said list of points partially dependent upon said collected information;

classifying each of said points in said list;

examining said classified list of points for a local extrema;

flagging any said local extrema found in said examining step;

dividing said list of points into sections bounded by corner points and/or said local extrema;

fitting either a straight line or a series of curves to each of said sections, resulting in a simplified line segment; and displaying on a display device coupled to said computer system a simplified graphical figure having said simplified line segment.

14. The method as recited in claim 13 wherein said line segment is selected from the group consisting of:

straight line segment; and curved line segment.

15. The method as recited in claim 14, further comprising the step of:

dividing said curved line segment at said local extrema point after said collecting step.

16. The method as recited in claim 15 wherein said local extrema point is selected from the group consisting of:

horizontal; and vertical.

17. The method as recited in claim 14 wherein said collecting step further comprises the steps of:

determining an approximate average length of a plurality of said straight line segments; and determining an approximate average length of a plurality of said straight line segments.

18. The method as recited in claim 17 wherein said creating step further comprises the step of:

placing a plurality of intermediate points of said line segment into said list of points.

19. The method as recited in claim 18 wherein an amount of said plurality of intermediate points is determined by a predetermined parameter modified by a ratio of an approximate length of said line segment and said approximate average length.

20. The method as recited in claim 13 wherein said creating step further comprises the steps of:

placing end-points of said line segment into said list of points; and placing an intermediate point of said line segment into said list of points.

21. The method as recited in claim 20 wherein said placing of said intermediate point is dependent upon a predetermined parameter.

22. The method as recited in claim 13 wherein said classifying step adds information about said path through each of said points in said list.

23. The method as recited in claim 22 wherein said information indicates whether said path passing through a point in said list of points is a corner, a smooth curve, or a tangent.

24. The method as recited in claim 23 wherein said information further comprises data on whether a slope of said path is substantially vertical.

25. The method as recited in claim 23 wherein said information marks end-points as said corners when said path is an open path.

26. The method as recited in claim 13 wherein said simplified line segment approximates said path within a predetermined tolerance.

27. The method as recited in claim 13 wherein said fitting step further comprises the steps of:

finding a first point in said list of points which is either a corner point or said extrema point;

finding a next point in said list of points which is either said corner point or said extrema point, said first and next points defining a section of points;

determining a slope of said path at each end of said section of points; and fitting, is able, a single curve to said section of points, said single curve having said slope at said each end, said single curve passing through said each end.

28. The method as recited in claim 27, further comprising the steps of:

dividing said section of points when said fitting step is unable to fit said single curve to said section of points; and fitting individual curves to each of said divided sections.

29. The method as recited in claim 28 wherein said dividing step is continued in a recursive manner until said divided sections of points are reduced to two points each.

30. The method as recited in claim 28, further comprising the step of:

replacing said simplified line segment with a straight line when said straight line would match said path within a predetermined tolerance, wherein said replacing step is performed when control points of a curve representation which defines said simplified line segment are within said predetermined tolerance of said straight line.

31. The method as recited in claim 29 wherein said slope at said local extrema is selected from the group consisting of:

horizontal; and vertical.

32. The method as recited in claim 27 wherein said slope at a point that is not said local extrema is an average of slopes of nearest points on either side of said point.

33. The method as recited in claim 27 wherein said fitting step further comprises the step of:

fitting a straight line to said section of points when said section contains only two points that are said corner points.

34. The method as recited in claim 13 wherein said path is comprised of more than one of said line segment.

\* \* \* \* \*